Sept. 9, 1969     M. ASHNER     3,465,606
GEAR SHIFT
Filed Dec. 8, 1967
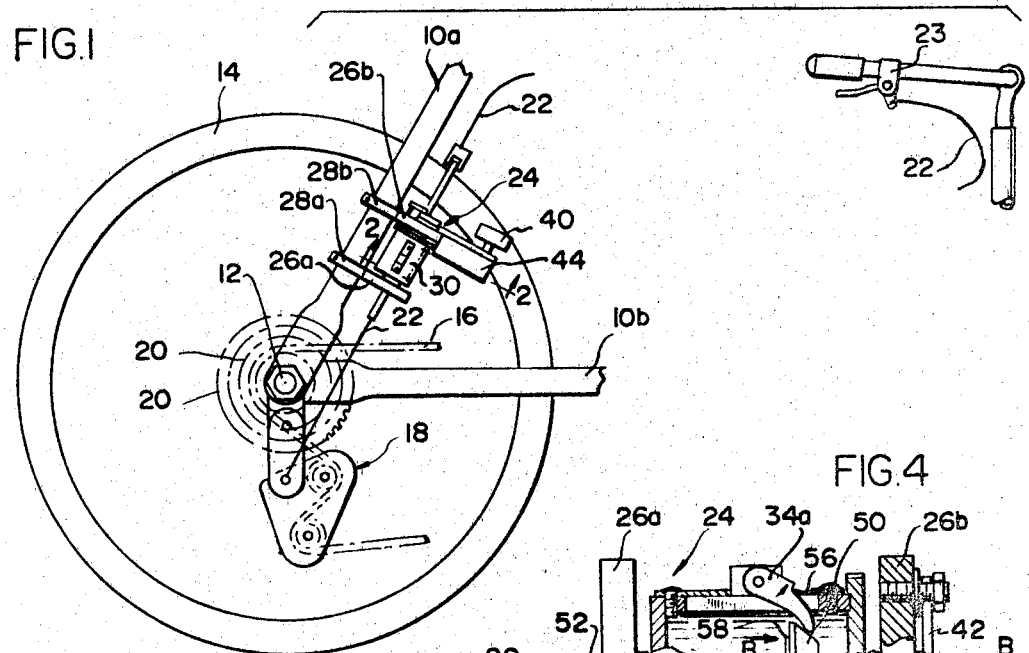
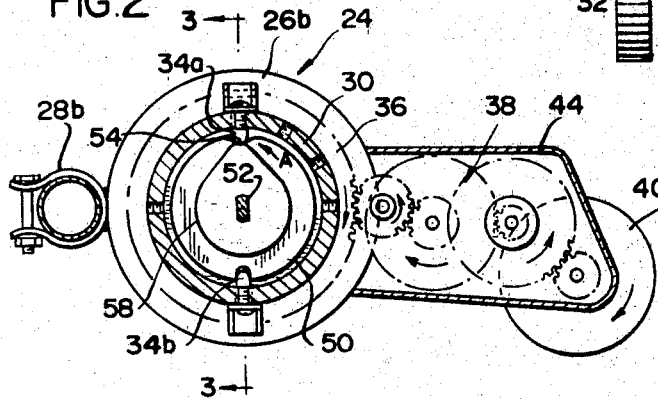
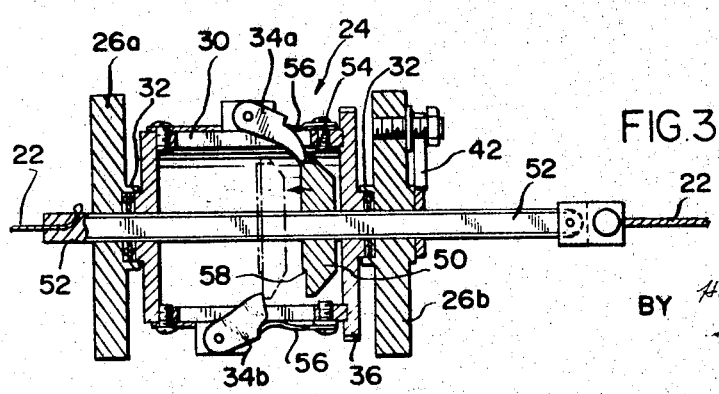
INVENTOR.
MARK ASHNER
BY Hofgren, Wegner, Allen,
Stellman & McCord
ATTORNEYS.

United States Patent Office 3,465,606
Patented Sept. 9, 1969

3,465,606
GEAR SHIFT
Mark Ashner, 5710 N. St. Louis Ave.,
Chicago, Ill. 60645
Filed Dec. 8, 1967, Ser. No. 689,067
Int. Cl. F16h 9/24, 11/08; B62m 9/06
U.S. Cl. 74—217                           11 Claims

ABSTRACT OF THE DISCLOSURE

An automatic shift unit for use with a bicycle or like chain driven vehicle which includes a drive means and a change speed gear mechanism for changing the gears by displacement of a sprocket chain transversely from one sprocket to another. The shift unit includes a cylinder which carries a plurality of pawl members extending radially inwardly toward the center of the cylinder. The pawl members are spaced axially and angularly about the interior wall of the cylinder. The cylinder is journalled on a framework for rotational movement relative thereto. A disc-shaped cam member is non-rotatably mounted on the framework for axial movement with the cylinder. The cam has a notch in the periphery thereof through which the pawl members may pass when aligned with the notch as the cam moves axially within the cylinder. The cam is operatively connected to the change speed gear mechanism to effect actuation of the gear mechanism. The pawl carrying cylinder is operatively connected to the drive means of the vehicle for rotation in direct proportion to movement of the drive means. As the cylinder and cam member rotate relative to each other the cam will intermittently move axially within the cylinder from one pawl member to the next and thereby effect intermittent shifting of the gears solely in response to continued movement of the drive means of the vehicle.

BACKGROUND OF THE INVENTION

Most bicycles today are provided with a plurality of sprocket wheels about the axle of the driven rear wheel. The sprocket wheels have different diameters to provide for a variable speed when a sprocket chain is shifted transversely from one sprocket wheel to the next. In such devices, it is conventional to provide a change speed gear mechanism which is controlled by a guided steel cable or flexible wire connected to the change speed gear mechanism and then leading to a manually operated hand lever on one of the handle bars of the bicycle. There are known shift units which are arranged to actuate the change speed gear mechanism in response to the degree of tension or slack in the cable leading to the bicycle handle bar. There have been various attempts to make the shift units automatic or semi-automatic to actuate the change speed gear mechanism as the bicycle is driven, aside from the usual manual control of the change speed gear mechanism. Most of these automatic gear shift devices actuate the change speed gear mechanism in response to varying speeds of the bicycle. For instance, a patent to Iseman 2,690,083 discloses an automatic shift unit to change the gears in response to different wheel speeds for causing proper selective use of the variable gear arrangements. This structure is operated by a weight which effects the gear shift by centrifugal force on the weight. A patent to Nelson 2,956,443 discloses a type of automatic shift unit which changes the gears in response to varying speeds and operates on a torque differential between a driving member and a driven member. However, it would be desirable to have an automatic shift unit which is not dependent upon the speed of the bicycle but is synchronized with one of the drive members of the bicycle to automatically shift the gears in direct proportion to movement of a particular drive member. This invention is related to providing such a device.

SUMMARY OF THE INVENTION

An object of this invention is to provide a new and improved automatic shift unit for bicycles or like chain driven vehicles.

Another object of this invention is to provide a new and improved automatic shift unit for bicycles or the like wherein the bicycle has a change speed gear mechanism for changing the gears on the driven wheel of the bicycle by displacement of a sprocket chain transversely from one sprocket to another, the shift unit intermittently shifting the change speed gear mechanism solely in response to movement of a particular drive member of the bicycle.

A further object of this invention is to provide an automatic gear shift unit for use with bicycles and the like as described in the preceding paragraph wherein the shift unit operates in direct proportion to movement of the particular drive member of the bicycle.

Still another object of this invention is to provide an automatic shift unit of the character described, including a pawl carrying cylinder operatively connected to a drive member of the bicycle and journalled on a framework for rotation relative to the framework in direct proportion to movement of the drive member, the pawls extending radially toward the center of the cylinder and spaced axially and angularly about the interior wall of the cylinder, a disc shaped cam member non-rotatably mounted on the framework for axial movement within the cylinder and operatively connected to the change speed gear mechanism to effect actuation of the gear mechanism, the cam member having a notch in the periphery thereof through which the pawls pass such that relative rotation between the cam and the cylinder will intermittently move the cam axially within the cylinder from one pawl to the next and thereby effect intermittent shifting of the gears solely in response to continued movement of the drive member.

Description of the drawings

FIG. 1 is a side elevational view showing the rear wheel of a bicycle with which the automatic gear shift unit of this invention and its associated attachments have been incorporated;

FIG. 2 is a sectional view, on an enlarged scale, taken generally along the line 2—2 in FIG. 1;

FIG. 3 is a vertical transverse sectional view taken substantially upon the plane indicated by the section line 3—3 of FIG. 2 and showing in particular certain details of the shift unit during the automatic shifting operation; and FIG. 4 is an elevational view looking to the left in FIG. 2, with portions broken away to illustrate in particular certain details of the shift unit as it is being manually reset.

Detailed description of the invention

Illustrated in the accompanying drawings and described hereinafter is an automatic shift unit in accordance with this invention which is especially adapted for use with bicycles or like chain driven vehicles. It is to be understood, however, that although the invention is specifically adapted for this particular use, it possesses varying utility as an automatic transmission for other uses, as for example with motorcycles, or other relatively lightweight power operated vehicles and implements. Consequently, it is not desired to limit the invention to the particular use illustrated in the drawings, which are by way of illustrating the principles of the invention only, except as necessitated in the claims appended hereto.

Referring to FIG. 1, there is shown the rear wheel and rear frame of a bicycle or similar vehicle which has the usual frame arms 10a, 10b which support an axle 12 of a driven rear wheel 14 of the bicycle. In FIG. 1, the rear wheel 14 is somewhat of a smaller scale than the other mechanism shown therein. The wheel is driven by a sprocket chain 16 which is operatively connected to a pedal actuated sprocket wheel (not shown in the drawings) of the bicycle. A change speed gear mechanism, indicated generally at 18, is provided for changing the gears on the rear wheel of the bicycle. The change speed gear mechanism is shown somewhat schematically in the drawings and is of the derailing type which changes the gears by displacement of the sprocket chain 16 transversely from one sprocket 20 on the axle 12 to another. The change speed gear mechanism 18 may include any one of many well known types which are operated by the tension or slack in a wire cable 22 to operate pulleys, pivot arms, or parallelogram structures in the chain speed gear mechanism, as is well known in the art, so as to move the sprocket chain 16 for engagement with the sprocket wheels 20 which are of different diameters to provide for variable speeds. The wire cable 22 normally extends forwardly for connection to an actuating hand lever 23 on the handle bar of the bicycle. Movement of the lever either relaxes or causes tension in the wire cable 22 to actuate the chain speed gear mechanism 18 to shift the gears and vary the speed. Slack in the wire cable 22 permits a biased auxiliary sprocket wheel, which guides the chain 16, to move axially to guide the chain to the various sprocket gears 20. The automatic shift unit of this invention, indicated generally at 24, is positioned intermediate the ends of the wire cable 22 and operates through the wire cable to actuate the change speed gear mechanism 18. The shift unit 24 is synchronized with one of the drive members of the bicycle to automatically operate the change speed gear mechanism in direct proportion to movement of the particular drive member.

In the embodiment illustrated, the automatic shift unit 24 of this invention comprises a framework consisting of a pair of generally parallel spaced supporting end discs 26a, 26b which receive the operating load of the unit and are mounted to the frame arm 10a by a pair of clamps 28a, 28b. Disposed between the supporting discs 26a, 26b is a pawl carrying drum or cylinder 30 which is journalled in a pair of opposed hubs 32 facing inwardly from the supporting discs 26a, 26b so that the cylinder may rotate freely relative to the fixed supporting discs. The cylinder 30 carries a plurality of spring biased pawls 34 which will be described in greater detail hereinafter.

The cylinder 30 is synchronized with one of the drive members of the bicycle so that it rotates in direct proportion to movement of the drive member. In the embodiment illustrated, a gear wheel 36 is fixedly secured to the cylinder 30 at one end thereof and is actuated, through a gear train generally designated 38 in FIG. 2, by a drive wheel 40 which is biased by a spring 42 against the rear wheel 14 of the bicycle for rotation therewith. The teeth on the gear 36 and on the gears of the gear train 38 are only partially shown. The gear train 38 may take many forms and, in the embodiment illustrated, is housed in a casing 44. It must be understood that the gear 36, the gear train 38 and the drive wheel 40 are but one of many means which may be employed to rotate the cylinder 32 in synchronization with the rear wheel 14 or some other drive member of the bicycle.

A cam member 50 is fixed to a shaft 52 which extends axially through the cylinder 30 and protrudes through the supporting end discs 26a, 26b. The shaft 52 is flat sided, as best seen in FIG. 2, and received in complementary bores in the cam and end discs so that the shaft and the cam member 50 carried thereby cannot rotate relative to the end discs 26a, 26b, but the shaft can slide axially in the end discs 26a, 26b. Cylinder 30 is therefore rotatable about the cam member 50. The cable 22 is secured to the shaft 52 on both sides of the unit. The cam member 50 is generally disc-shaped and has a notch 54, as best seen in FIG. 2, about the periphery thereof. The pawls 34a and 34b are spring biased inwardly by leaf springs 56 and normally protrude radially toward the center of the cylinder 30 beyond the outer periphery of the cam member 50.

Tension on the cable 22, caused by the biasing of change speed gear mechanism 18, urges the shaft 52, and cam member 50 attached thereto, to the left as seen in FIGS. 3 and 4. However, unless the notch 54 in the periphery of the cam member 50 (when the cam is positioned as in FIG. 3) is in alignment with the pawl 34a shaft and cam movement are resisted by the pawl. When aligned, the pawl 34a will pass under the biasing influence of the change speed gear mechanism 18 through the notch 54 in the periphery of the cam member 50, thereby causing the shaft 52 and cam member 50 to shift axially in the cylinder until the cam 50 abuts the next pawl 34b, as is seen in phantom in FIG. 3.

The pawls 34 are spaced axially along cylinder 30 such that the distance between the pawls will create sufficient slack in the wire cables 22 leading to the change speed gear mechanism 18 to permit the change speed gear mechanism to displace the sprocket chain 16 transversely on the sprocket wheels 20 equal to one gear shift and the motion is then checked by the next pawl. Of course, the angular positioning of the pawls about the cylinder 20 is a matter of choice and can be varied to change the relative time lapse between gear changes.

As can be seen from FIG. 2, the sides of the notch 54 in the periphery of the cam member 50 are bevelled so as to permit the pawls 34 to ride out of the notch without causing binding. In addition, to provide for a smooth operation, a land 58 is formed integrally on the back side of the cam member 50 which has a configuration as shown in FIG. 2 so as to provide a guiding surface to smoothly direct the pawls 34 toward the notch 54 in the direction of arrow A (FIG. 2), as the pawls 34 ride on the land 58 toward the notch 54.

Of course, it is to be understood that in order to provide for the automatic shifting of the gears, sufficient relaxing of the wire cable 22 to the right of the shift unit as seen in the drawings must be effected by the hand lever 23 on the handle bar of the bicycle. Conversely, it can therefore be seen that the amount of slack in the cable can be regulated by the lever so as to limit automatic shifting to less than all of the sprocket gears 20 on the rear wheel of the bicycle.

In order to reset the automatic shift unit, the hand lever on the handle bar is moved to pull the wire cable 22 and the cam member 50 in the direction of arrows B (FIG. 4). Since the pawls 34 are spring biased, the cam member 50 will simply ride on the interior surface of the pawl which acts as a camming surface to move the pawl against the spring until the pawl snaps behind the cam member 50 and is positioned for subsequent automatic shifting operation.

It must be understood that a wide variety of structures are contemplated as utilizing the principles of this invention. Any number of conceivable cam and pawl mechanism can be constructed when the basic concept of this invention is utilized. Even with the structure shown in the drawings, the cylinder and pawls 34 may be held fixed between the end discs 26a, 26b and the cam member 50 and/or the shaft 52 may be synchronized with one of the drive members of the bicycle to rotate relative to the fixed cylinder.

It is also to be understood that this same invention is so designed that it can be used in conjunction with any change speed gear mechanism that employs the use of a lever operated tension cable, and it is not to be limited in use to the type of change gear mechanism described above.

The foregoing detailed description has been given for clearness of understanding only and no unnecessary limitations should be understood therefrom as some modifications will be obvious to those skilled in the art.

I claim:
1. An automatic shift unit for a bicycle or like chain driven vehicle which includes a drive means and a change speed gear mechanism for changing the gears by displacement of a drive chain transversely from one sprocket gear to another, the improvement comprising a cam member and a complementary pawl member one of which is mounted for rotational movement relative to a framework, the other of said members being mounted for linear movement relative to said framework and said one member, said one member being operatively connected to a drive means of said vehicle to rotate said one member in response to movement of said drive means, the other of said members being operatively connected to said change speed gear mechanism to move said drive chain transversely from one sprocket to another in response to relative linear movement between said members, said members being arranged to effect an intermittent, relative linear movement between said members in response to relative rotational movement between the members to intermittently shift said change speed gear mechanism in direct proportion to the movement of said drive means.

2. The automatic shift unit of claim 1 including a cylinder journalled on the framework for rotation relative to the framework and a plurality of said pawl members secured to said cylinder for rotation therewith and extending radially inwardly toward the center of the cylinder, said cam member being non-rotatably mounted on said framework for axial movement within said cylinder for engaging said pawl members.

3. The automatic shift unit of claim 2 wherein said cam member is disc-shaped in a plane generally perpendicular to the axis of the cylinder and wherein said pawl members normally extend inwardly beyond the outer periphery of the cam.

4. The automatic shift unit of claim 3 wherein said disc-shaped cam member has a notch in the periphery thereof through which said pawl members may pass when aligned therewith on axial movement of the cam member within the cylinder.

5. The automatic shift unit of claim 4 wherein movement of said cam member axially in one direction within said cylinder effects actuation of said change speed gear mechanism and movement of the cam in the opposite direction resets said shift unit, and wherein said pawl members are spring biased inwardly to block movement of said cam member in said one direction unless a pawl member is aligned with said notch in the periphery of the cam member to permit movement of the cam member past the pawl to actuate the gear shift mechanism.

6. The automatic shift unit of claim 5 wherein said pawl members have a camming surface engageable with the periphery of said cam member on movement of the cam in said opposite direction to move the pawl members against the biasing of their springs out of their blocking relationship with the cam member to permit resetting the shift unit.

7. The automatic shift unit of claim 4 wherein said pawl members are spaced axially and angularly about the interior of said cylinder whereby movement of said cam member axially within the cylinder intermittently from one pawl member to the next actuates the change speed gear mechanism to effect intermittent shifting of said gears solely in response to relative rotation between said members.

8. The automatic shift unit of claim 7 wherein said disc-shaped cam member has a shaft fixed thereto and extending in opposite directions therefrom axially of the cylinder, the shaft on the side of said cam in said one direction having a flexible cable connected to the shaft and leading to said change speed gear mechanism to actuate the mechanism in response to linear movement of the cam and its shaft.

9. The automatic shift unit of claim 2 wherein said bicycle includes a driven rear wheel, said shift unit including a rotatable wheel biased against said rear wheel for rotation therewith, and a drive train operatively connecting said wheel and said cylinder to rotate the cylinder in direct proportion to the rotation of the rear wheel of the bicycle.

10. The automatic shift unit of claim 9 wherein said drive train includes gear means disposed in a housing fixed to said framework.

11. A shift unit for a bicycle or like chain driven vehicle which includes a drive means and a change speed gear mechanism for changing the gears by displacement of a drive chain from one sprocket gear to another, comprising means synchronized with the drive means of the bicycle and operatively associated with the change speed gear mechanism to automatically shift the gears solely in response to and in direct proportion to continued movement of the drive means of the bicycle.

References Cited

UNITED STATES PATENTS 2,117,116   5/1938   Page _____ 74—217

FOREIGN PATENTS 460,114    10/1950   Italy.
601,744    5/1948    Great Britain.
1,021,164  11/1952   France.

FRED C. MATTERN, Jr., Primary Examiner

JAMES A. WONG, Assistant Examiner